(12) United States Patent
Krupka et al.

(10) Patent No.: US 9,734,435 B2
(45) Date of Patent: Aug. 15, 2017

(54) RECOGNITION OF HAND POSES BY CLASSIFICATION USING DISCRETE VALUES

(71) Applicant: Microsoft Technology Licensing, LLC, Redmond, WA (US)

(72) Inventors: Eyal Krupka, Shimshit (IL); Alon Vinnikov, Ramat-Gan (IL); Kfir Karmon, Petach-Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/985,741

(22) Filed: Dec. 31, 2015

(65) Prior Publication Data

US 2017/0193334 A1    Jul. 6, 2017

(51) Int. Cl.
*G06K 9/00*     (2006.01)
*G06K 9/62*     (2006.01)
*G06K 9/66*     (2006.01)

(52) U.S. Cl.
CPC ....... *G06K 9/6267* (2013.01); *G06K 9/00355* (2013.01); *G06K 9/66* (2013.01)

(58) Field of Classification Search
None
See application file for complete search history.

(56) References Cited

U.S. PATENT DOCUMENTS

| | | | |
|---|---|---|---|
| 6,788,809 B1 * | 9/2004 | Grzeszczuk | G06F 3/017 345/419 |
| 8,878,906 B2 * | 11/2014 | Shotton | H04N 13/0203 348/46 |
| 9,213,890 B2 * | 12/2015 | Huang | G06F 3/017 |
| 2013/0336524 A1 * | 12/2013 | Zhang | G06K 9/00355 382/103 |
| 2014/0204013 A1 | 7/2014 | O'Prey et al. | |
| 2015/0138078 A1 | 5/2015 | Krupka et al. | |

OTHER PUBLICATIONS

Liang et al., "Model-based hand pose estimation via spatial-temporal hand parsing and 3D fingertip localization", Vis Comput (2013) 29:837-848.*

(Continued)

*Primary Examiner* — Soo Park

(57) ABSTRACT

Computer implemented method for computing a feature dataset classifying a pose of a human hand, comprising:

(a) Selecting a global orientation category (GOC) defining a spatial orientation of a human hand in a 3D space by applying GOC classifying functions on a received image segment depicting the hand.

(b) Identifying in-plane rotation by applying in-plane rotation classifying functions on the image segment, the in-plane rotation classifying functions are selected according to said GOC.

(c) Aligning the image segment in a 2D plane according to the in-plane rotation.

(d) Applying hand pose features classifying functions on the aligned image segment.

Each one of the feature classifying functions outputs a current discrete pose value of an associated hand feature.

(e) Outputting a features dataset defining a current discrete pose value for each of the hand pose features for classifying current hand pose of the hand.

22 Claims, 7 Drawing Sheets

(56) References Cited

OTHER PUBLICATIONS

International Search Report and the Written Opinion dated Mar. 24, 2017 From the International Searching Authority Re. Application No. PCT/US2016/067894. (18 Pages).

Krupka et al. "Discriminative Ferns Ensemble for Hand Pose Recognition", Proceedings of the 2014 IEEE Conference on Computer Vision and Pattern Recognition, CVPR'14, Jun. 23-28, 2014, XP032649420, p. 3670-3677, Jun. 23, 2014.

Sharp et al. "Accurate, Robust, and Flexible Real-Time Hand Tracking", Human Factors in Computing Systems, Mid-Air Gestures and Interactions, CHI 2015, Seoul, Republic of Korea, Apr. 18-23, 2015, XP058068053, p. 3633-3642, Apr. 18, 2015. p.3637.

Sun et al. "Cascaded Hand Pose Regression", 2015 IEEE Conference on Computer Visison and Pattern Recognition, CVPR'15, Jun. 7-12, 2015, XP032793493, p. 824-832, Jun. 7, 2015.

Xu et al. "Estimate Hand Poses Efficiently From Single Depth Images", International Journal of Computer Vision, XP035934562, 116(1): 21-45, Published Online Apr. 19, 2015. p. 25, Section 2.3, p. 27-28, Section 3, p. 32, Section 6.

\* cited by examiner

RECOGNITION OF HAND POSES BY CLASSIFICATION USING DISCRETE VALUES

RELATED APPLICATIONS

This application is related to co-filed, co-pending and co-assigned U.S. Patent Applications entitled "HAND GESTURE API USING FINITE STATE MACHINE AND GESTURE LANGUAGE DISCRETE VALUES" (Ser. No. 14/985,691), "MULTIMODAL INTERACTION USING A STATE MACHINE AND HAND GESTURES DISCRETE VALUES" (Ser. No. 14/985,716), "TRANSFORM LIGHTWEIGHT SKELETON AND USING INVERSE KINEMATICS TO PRODUCE ARTICULATE SKELETON" (Ser. No. 14/985,777), "STRUCTURE AND TRAINING FOR IMAGE CLASSIFICATION" (Ser. No. 14/985,803), "TRANSLATION OF GESTURE TO GESTURE CODE DESCRIPTION USING DEPTH CAMERA" (Ser. No. 14/985,804), "GESTURES VISUAL BUILDER TOOL" (Ser. No. 14/985,775), "ELECTRICAL DEVICE FOR HAND GESTURES DETECTION" (Ser. No. 14/985,728) and "DETECTION OF HAND GESTURES USING GESTURE LANGUAGE DISCRETE VALUES" (Ser. No. 14/985,680), the disclosures of which are incorporated herein by reference.

REFERENCES CITED

Materials incorporated by reference in this disclosure include the following:

Eyal Krupka et al., "Discriminative Ferns Ensemble for Hand Pose Recognition"

BACKGROUND

With the evolution of multimodal human-machine interfaces (HMI) such as, for example, voice, gaze and/or gesture interaction there is a growing need for machine interaction recognition platforms, systems and/or methods. Hand gestures specifically may serve as a natural human interface (NUI) presenting multiple advantages, for example, eliminating and/or reducing the need for intermediator devices (such as keyboard and/or pointing devices), supporting hands free interaction, improving accessibility to population(s) with disabilities and/or providing a multi-modal interaction environment.

Current solutions for identifying and/or recognizing hand(s) poses and/or gestures may exist, however they are mostly immature, presenting insufficient capabilities while requiring high computation resources for computer vision processing and/or machine learning. Such technologies may rely on full hand skeleton articulation and/or complex machine learning algorithms for classification of the hand poses and/or gestures which may make such implementations costly and unattractive for wide spread use. Furthermore accuracy of current solutions for hand(s) poses and/or gestures recognition may often prove to be insufficient for proper operation. The implementation complexity of such technologies and/or the extensive processing resources they impose on a developer for integrating them into applications, systems, platforms and/or devices may result with the developers avoiding using these technologies.

SUMMARY

According to some embodiments of the present disclosure, there are provided systems and methods for classification of hand poses by analyzing image(s) capturing a hand of a user and identifying discrete pose values defining discrete states of hand rotation and/or features (properties) in order to classify a pose of the imaged hand. The image(s) depicting the hand is captured by one or more imaging devices is processed and/or classified by one or more processors in several steps, each serving as a starting point for the next step. Classification of the hand poses is done by applying trained classifying functions which match the plurality of discrete pose values extracted from the captured image(s) with corresponding discrete values optimized during a training session. However, prior to the classification of the hand poses, one or more adjustments and/or manipulations may be performed on the captured image(s) to align the visual representation of the hand captured in the image(s) with the capturing conditions which were used during the training session.

The initial step may be identifying the center of mass of the hand depicted in the image(s) followed by fine tune analysis to identify the center of the hand. During each of the following steps the image(s) of the hand is processed using a discrete value architecture in which a plurality of trained classifying functions (classifiers) are applied to the image(s) to solve and classify a state of the hand, for example, hand 3 dimensional (3D) spatial orientation, hand alignment and/or a plurality of hand pose features, for example, hand location, fingers flexion, fingers direction, fingers tangency and/or fingers relative location. Continuous values of the one or more hand features may be represented by discrete hand values by quantizing the continuous values to support the discrete architecture of the hand pose detection process.

For each of the classification process steps a dedicated set of classifying functions is used where the classifying functions are based on discrete values for the respective hand feature which is classified. The result of the classification process is a discrete skeletal representation of the hand pose through a dataset containing the discrete values of the corresponding hand pose features which classify the hand pose in the captured image(s) as one of pre-defined hand poses available in storage. The pre-defined hand poses as referred to hereinafter throughout this disclosure refers to pre-defined hand poses representations which simulate respective hand poses of a hand(s). The sets of classifying functions are trained during a training session in which a plurality of datasets is driven to the classifying functions and a pose class label is assigned to each of them. The classifying functions may employ statistical processing, for example, regression analysis, discriminative fern ensemble (DFE) and/or "long tree". Each of the plurality of DFE, and/or "long tree" classifiers is associated with one of the hand pose features and may include a table of binary values which are matched to the captured image(s) on pixel-by-pixel base and the image(s) contents is classified according to the matching results.

The DFE, and/or "long tree" classifiers (representing the hand pose features) may be stacked and/or concatenated to increase the number of classifying functions. Stacking and/or concatenated the DFE and/or "long tree" classifiers may improve the accuracy of the classification of the hand pose. Employing the DFE and/or "long tree" architecture may dramatically reduce the computation load required for the classification process in runtime as the classifying functions operate over binary values of the discrete pose values each corresponding to one of the hand pose features.

Continuous values of the one or more hand pose features may be represented by discrete pose values by quantizing the continuous values to support the discrete architecture of the classifying functions. Binary values comparison by nature may not require complex computations. Moreover, as larger training sets are used the classification functions' DFE tables get larger, and a better and/or more accurate hand pose classification may be achieved. Furthermore due to the discrete nature of the classification process in which discrete values of the hand pose features are processed, a finite number of possible values, for example 5, 10 and/or 20 may be valid for each hand pose features avoiding the need to fully articulate the hand skeleton thus further reducing computer vision and modeling resources.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
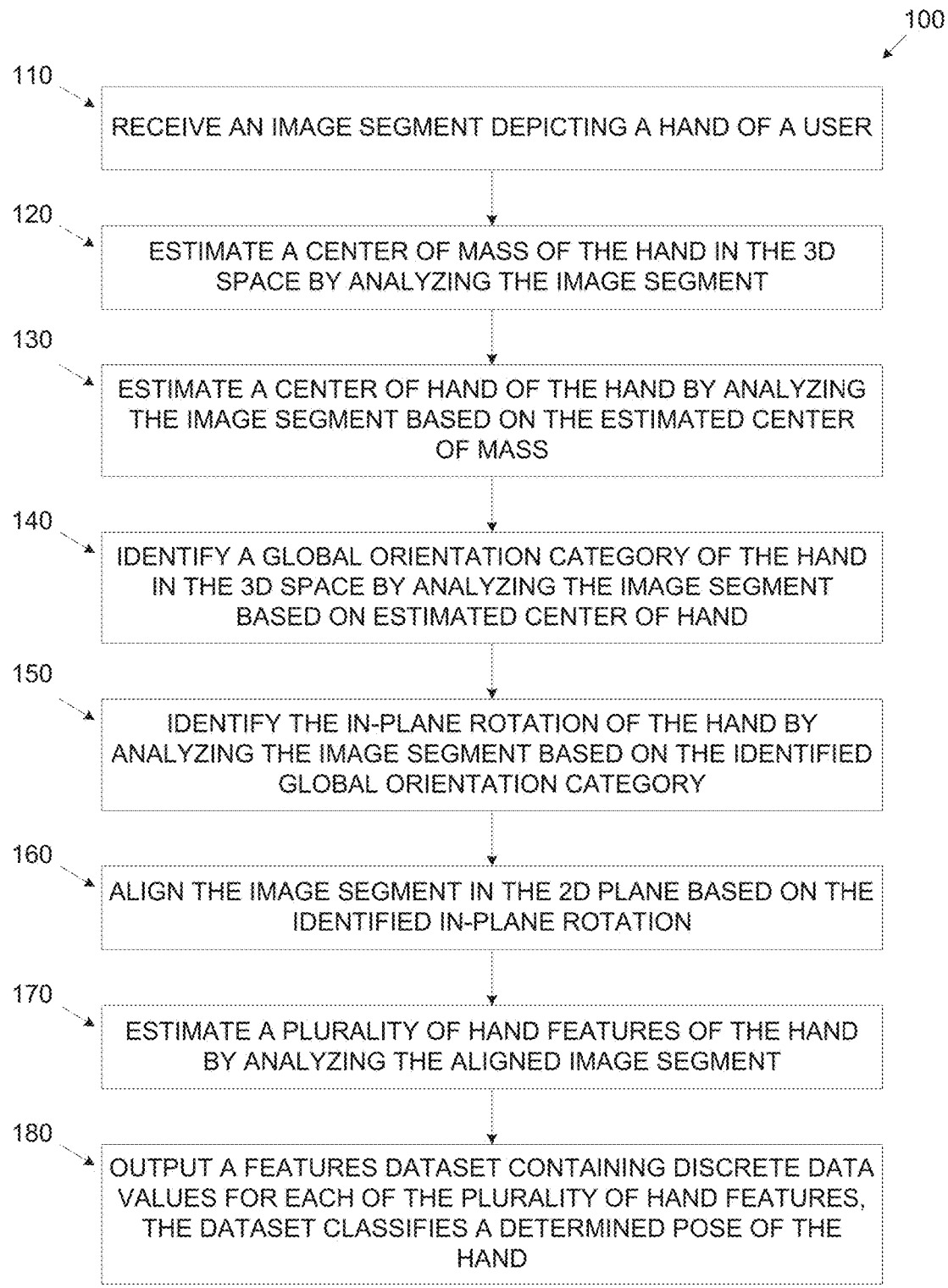
FIG. 1 is a flowchart of an exemplary process for classifying hand poses using discrete pose values, according to some embodiments of the present disclosure.

According to some embodiments of the present disclosure, there are provided systems and methods for classification of hand poses by analyzing image(s) capturing a hand of a user and identifying discrete pose values defining discrete states of hand rotation and/or features (properties) in order to classify a pose of the imaged hand. The image(s) depicting the hand is captured by one or more imaging devices, for example, camera sensor, stereo camera, depth camera and/or infra-red (IR) camera and is processed and/or classified by one or more processors in several steps, each serving as a starting point for the next step. The classification process of the one or more hand poses is done by applying trained classifying functions which match the plurality of discrete pose values extracted from the captured image(s) with corresponding discrete values optimized during a training session. However, prior to the classification of the hand poses, one or more adjustments and/or manipulations may be performed on the captured image(s) to align the visual representation of the hand captured in the image(s) with the capturing conditions which were used during the training session.

The one or more adjustments and/or manipulations may also utilize classification using trained classifying functions. The initial step may be estimating the center of mass of the hand depicted in the image(s) to identify a relevant image segment which may be processed during the classification process. The center of mass estimation may be followed by fine tune analysis to estimate the center of the hand. Based on depth data available within the received image(s), the image(s) may be further manipulated to remove elements which are irrelevant to the depicted hand, such as for example, background static elements (which may be identified through comparison of successive images) and/or pixels which are at a certain absolute and/or relative distance from the depicted hand where the distance may be set according to threshold value. Removing the irrelevant data from the image(s) may improve the classification processes analyses.

Discrete pose values architecture is the basis for classification process in which during each of the classification steps a plurality of trained classifying functions (classifiers) are applied to the image(s) segment to solve and/or classify one or more states of the hand are solved. Continuous values of the one or more hand pose features, for example, hand 3D spatial position and/or finger(s) to palm relative angle(s), may be represented by discrete pose values by quantizing the continuous values to support the discrete architecture of the classifying functions. Multi-class classification and/or multiple binary classifying functions may be trained using one classifying function versus other one or more classifying functions. During the training session the classifying functions providing the highest accuracy and/or match are selected. The classifying functions include, for example, hand 3 dimensional (3D) spatial rotation, hand alignment and/or a plurality of hand pose features, for example, hand location, fingers flexion, fingers direction, fingers tangency and/or fingers relative location. The 3D spatial rotation of the hand may be estimated in two stages by first identifying a global orientation category (GOC) which represents rotation that cannot be compensated for with respect to a two-dimensional (2D) plane of the imaging device(s), followed by identifying an in-plane rotation which defines the rotation of the hand within 2D plane of the imaging device. For each of the classification process steps a dedicated set of classifying functions is used.

The classification process creates a discrete skeletal representation of the hand pose by producing a dataset containing a plurality of discrete pose values each corresponding to one of the hand pose features. The dataset classifies one or more hand poses depicted in the captured image(s) as one or more of pre-defined hand poses available in storage. The sets of classifying functions are trained during a training session in which a plurality of training datasets, for example, image(s) of a plurality of hand pose(s) by one or more users and/or a plurality of hand pose(s) models is driven to the classifying functions and a class label is assigned to each of them. The classifying functions may employ statistical processing, for example, regression analysis and/or use of a plurality of DFEs. Each of the plurality of DFE classifiers includes one or more tables of discrete pose values which are associated with one of the hand pose features collected and classified during the training process using the training data. The DFE tables hold weight values which are matched to the image segment on pixel-by-pixel base and the contents of the image segment is classified according to the matching results. The DFE, classifiers (each associated with one of the hand pose features) may be stacked and/or concatenated to enlarge the DFE structure and increase the number of classifying functions. Stacking and/or concatenated the DFE classifiers may improve the accuracy of the classification of the hand pose depicted by the image(s) segment.

Further detailed description of using DFE architecture for hand pose recognition is described in publication "Discriminative Ferns Ensemble for Hand Pose Recognition" by Eyal Krupka et al., whose disclosure is incorporated herein by reference. Optionally, the classifying functions used for, for example, the hand 3 dimensional (3D) spatial rotation, the hand alignment and/or the plurality of hand features (pose and motion) employ trained discriminative tree ensembles (DTE) also referred to herein as "long tree" and/or a combination of DFEs and "long tree". Further detailed description of creating, training and/or using and/or a combination of DFEs and "long tree" architecture for hand pose and/or motion recognition is described in U.S. patent application Ser. No. 14/985,803 entitled "Structure and Training for Image Classification", whose disclosure is incorporated herein by reference.

Classification of the one or more hand poses using the DFE and/or "long tree" architecture based on discrete representation of the hand skeleton may dramatically reduce the processing resources required for the classification process in runtime as the classifying functions operate over binary values of the discrete pose values each corresponding to one of the hand pose features. Binary values comparison by nature may not require complex computations. Moreover, larger training sets may be used for the classification functions' DFE tables and/or "long tree" to increase the accuracy of the hand pose classification. Since the training is done offline runtime computing resources may remain low. Furthermore, computer learning, computer vision and/or modeling resources may be greatly reduced since full articulation, modeling and/or generation of the hand skeleton are avoided due to the discrete architecture of the classification process in which the discrete pose values used for classification may include only a finite number of possible values, for example 5, 10 and/or 20 which may be valid for a corresponding hand pose features.

Before explaining at least one embodiment of the exemplary embodiments in detail, it is to be understood that the disclosure is not necessarily limited in its application to the details of representation and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a flowchart of an exemplary process for classifying hand poses using discrete pose values, according to some embodiments of the present disclosure. An exemplary classification process 100 presents a classification process of a hand pose of a user. As shown at 110, the exemplary process 100 starts with receiving one or more image(s) depicting a hand(s) movement of a user. The image(s) may be captured using one or more imaging devices, for example, a camera sensor, a stereo camera, a depth camera and/or an IR sensor.

As shown at 120, the one or more image(s) are processed to estimate a center of mass of the hand so as to place the hand within the 3D space presented by the one or more image(s). The center of mass is estimated by processing the depth data available from the one or more imaging device and is represented in a 3-axes format (x, y, z). According to the estimated center of mass, a relevant image segment may be selected to be processed and classified later on during the classification process 100 to avoid processing irrelevant image sections. Based on depth data available within the received image(s), the image segment may be further manipulated to remove elements which are irrelevant to the depicted hand, such as for example, background static elements (which may be identified through comparison of successive images) and/or pixels which are at a certain absolute and/or relative distance from the depicted hand where the distance may be set according to threshold value.

Removing the irrelevant data from the image(s) which and/or reducing the image size to include only the relevant portion depicting the hand may later on improve the classification process 100 by as processing unnecessary image contents maybe avoided. By improving the classification process 100 computation load and/or processing resources may be reduced. Following the estimation of the hand center of mass, the image segment (may also be referred to as patch) is positioned so as to be located in a pre-defined location appropriate for executing the statistical classification analyses of the succeeding steps of the classification process 100 since the captured image(s) should be compatible (with respect to location and/or position) with the training data used to train the classifiers which are employed in the following steps of the classification process 100.

Optionally, the relevant image segment(s) is scaled so as to be at a pre-defined distance from the imaging device. Once again this may be required in order to place the image segment in a pre-defined location appropriate for executing the statistical classification analyses of the succeeding steps of the classification process 100 since the captured image(s) should be compatible (with respect to size and distance) with the training data used to train the classifiers which are employed in the following steps of the classification process 100.

As shown at 130, a fine tuning analysis is conducted on the relevant image segment(s) to estimate the center of hand. The center of hand is again defined in a 3-axes format (X, Y, Z) in the 3D space depicted by the image(s). Estimation of the hand center may be performed through one or more statistical classification analyses, for example, regression analysis, support vector machine(s) (SVM), DFE and/or "long tree". During estimation of the center of the hand using DFE and/or "long tree" classifiers a set of one or more trained hand center classifying functions is applied to the relevant image segment(s) as estimated during the center of mass estimation step 120.

Optionally, the hand position may be estimated using techniques other than center of mass and/or center of hand. Such techniques may include, for example, hand 3D volumetric modeling, hand 3D skeletal modeling, hand shape estimation, hand contour estimation and/or hand silhouette estimation.

Optionally, the hand position used for analysis by the classification process 100 succeeding steps is estimated according to an anatomical reference point other than the center of hand, for example, wrist joint and/or thumb-palm connecting joint.

As shown at 140, a GOC is identified and estimated for the hand as depicted by the relevant image segment(s). The GOC represents the rotation state of the hand depicted in the image segment(s) within the 3D space. Since the 3D rotation may not be fully compensated for and/or taken into account with respect to the 2D plane of the imaging device in a 2D space analysis, the actual 3D rotation must be first identified in order to select an appropriate set of classifying functions which is adapted to the selected GOC. The 3D rotation may be defined using, for example, Euler angles and/or Tait-Bryan angles relative to a pre-defined hand orientation.

For example, a hand which is facing frontal to the imaging device may be defined as a reference image with angles (0, 0, 0) while other hand orientation defined are define as the three rotation angles with respect to the reference image using, for example, a Tait-Bryan angles definition. Optionally the 3D rotation angles may not be estimated precisely, however it the estimation is sufficient to represent the hand orientation angles with discrete categories. This means that for different GOCs, different sets of classifying functions may be selected. Identifying and selecting the GOC may be performed through one or more statistical classifiers, for example, DFE and/or "long tree". Identification and selection of the GOC of the hand using the DFE and/or "long tree" classifiers is done using a set of one or more trained GOC classifying functions applied to the relevant image segment(s).

Figure 2:
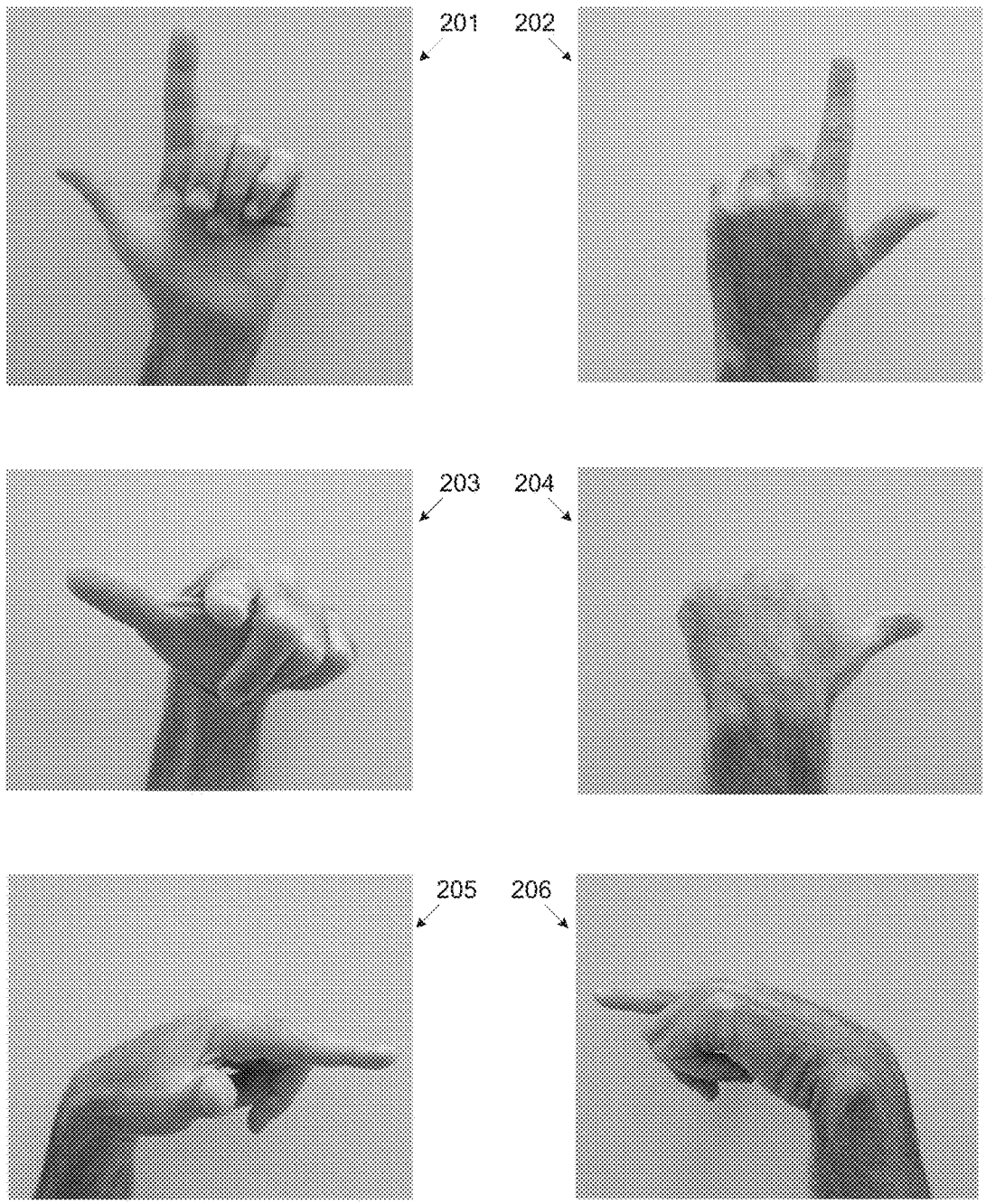
FIG. 2 is a schematic illustration of exemplary global orientation categories (GOC), according to some embodiments of the present disclosure.

Reference is now made to FIG. 2 which is a schematic illustration of exemplary global orientation categories (GOC), according to some embodiments of the present disclosure. Exemplary GOCs 201, 202, 203, 204, 205 and 206 are defined to select the appropriate set of classifying functions which is adapted to the selected GOC 201-206. As shown the GOCs 201-206 are discrete values, such as, for example, front-facing, back-facing, right-facing, left-facing, up-facing and/or down-facing. Reducing the GOC to a finite number of category values, in this example, 6 allows for efficient classification while using limited and/or low processing resources.

Reference is made once again to FIG. 1. As shown at 150, after the GOC is selected an in-plane rotation is identified and selected. The in-plane rotation is identified and estimated using a set of a plurality of in-plane classifying functions (classifiers) which are adapted to the estimated specific GOC. The in-plane classifying functions, for example DFE and/or "long tree" classifiers are applied to the relevant image segment(s) to identify the rotation within the plane which is identified by the specific GOC. The in-plane rotation may be a continuous value however it is quantized to be represented by discrete values to be used by the in-plane classifying functions.

As shown at 160, the relevant image segment(s) is aligned in the 2D plane identified by the in-plane rotation step 150 so that the hand is placed in a known state which may allow for simpler and/or more deterministic classification of a plurality of hand pose features later on during the classification process 100.

Figure 3:
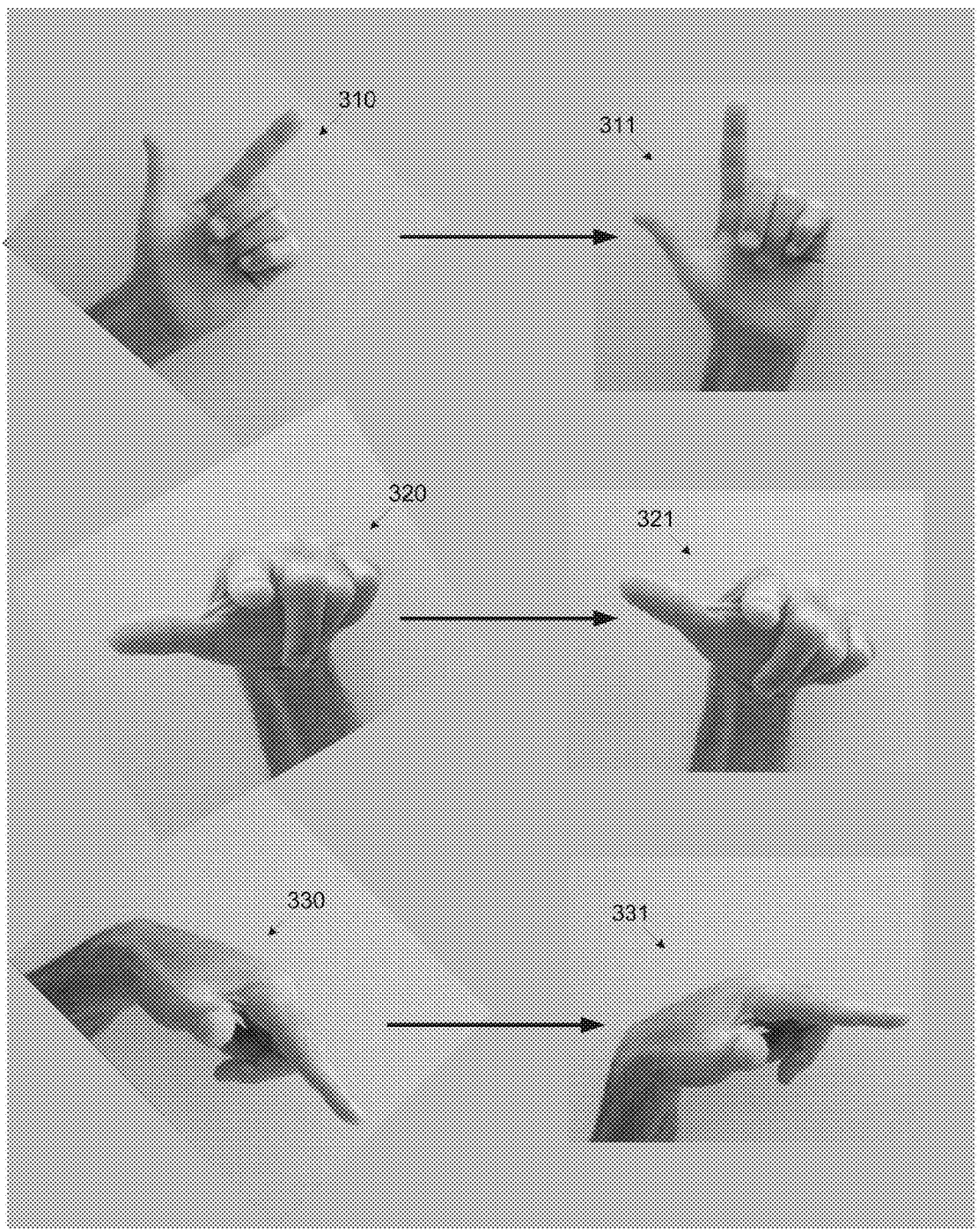
FIG. 3 is a schematic illustration of an exemplary alignment operation following in-plane rotation identification, according to some embodiments of the present disclosure.

Reference is now made to FIG. 3 which is a schematic illustration of an exemplary alignment operation following in-plane rotation identification, according to some embodiments of the present disclosure. A first exemplary hand pose as shown at 310 which was assigned a GOC, for example, up-facing is processed to identify an in-plane rotation using a set of a plurality of in-plane classifying functions appropriate for the selected up-facing GOC. The in-plane rotation, in this example, rotated left, is identified and the image segment is aligned to the right to bring the depicted hand to an upright state as shown at 311. A second exemplary hand pose as shown at 320 which was assigned a GOC, for example, front-facing is processed to identify an in-plane rotation using a set of a plurality of in-plane classifying functions appropriate for the selected front-facing GOC. The in-plane rotation, in this example, rotated right is identified and the image segment is aligned to the left to bring the depicted hand to an upright state as shown at 321. A third exemplary hand pose as shown at 330 which was assigned a GOC, for example, left-facing is processed to identify an in-plane rotation using a set of a plurality of in-plane classifying functions appropriate for the selected left-facing GOC. The in-plane rotation, in this example, rotated left is identified and the image segment is aligned to the right to bring the depicted hand to an upright state as shown at 331.

Reference is made one again to FIG. 1. As shown at 170, the aligned image segment is processed by applying on it one or more of a plurality of feature classifying functions (classifiers), for example, DFE and/or "long tree" classifiers. Each of the plurality of feature classifying functions is associated with a hand pose feature, for example, hand location, palm direction, palm rotation, fingers flexion, fingers direction, fingers tangency and/or fingers relative location. Each of the plurality of hand pose features is estimated with a discrete pose value representing a state of the corresponding hand feature.

As shown at 180, a features dataset comprising the one or more discrete pose values each representing a state of a corresponding hand feature as estimated in the image segment is created and made available to one or more users and/or applications. The features dataset classifies the hand pose depicted by the image segment as a determined one of a plurality of hand poses available in, for example, a gesture library, a gesture plug-in and/or a storage medium. Optionally, the features dataset includes a score describing a probability rate of the classification of the hand pose depicted by the image segment being the determined hand pose. The features dataset is basically a discrete representation of the hand skeleton which is compared to pre-defined features datasets of classified and/or registered hand poses. The one or more sets of trained classifying functions (classifiers), such as, for example, the hand center classifying functions, the GOC classifying functions, the in-plane rotation classifying functions and/or the hand pose features classifying functions may be created offline using a plurality of training datasets, for example, one or more image segments of a plurality of hand pose(s) by one or more users and/or a plurality of hand pose(s)' models which is driven to the classifying functions and a corresponding label is assigned to each of the training datasets.

For example, each of the GOC classifying functions is assigned one of the GOC discrete labels (category), each of the in-plane rotation classifying functions is assigned a rotation label (rotation direction and/or degree) and/or the stacked and/or concatenated hand pose features classifying functions are assigned with a hand pose label (pose label of pre-defined and/or registered poses). Using the discrete based classifying functions reduces the hand skeleton to a discrete representation which may include a finite number of discrete pose values for each of the plurality of hand pose features. As result the computation resources as well as the computer vision processing required for the classification process 100 may be greatly reduced.

Figure 4:
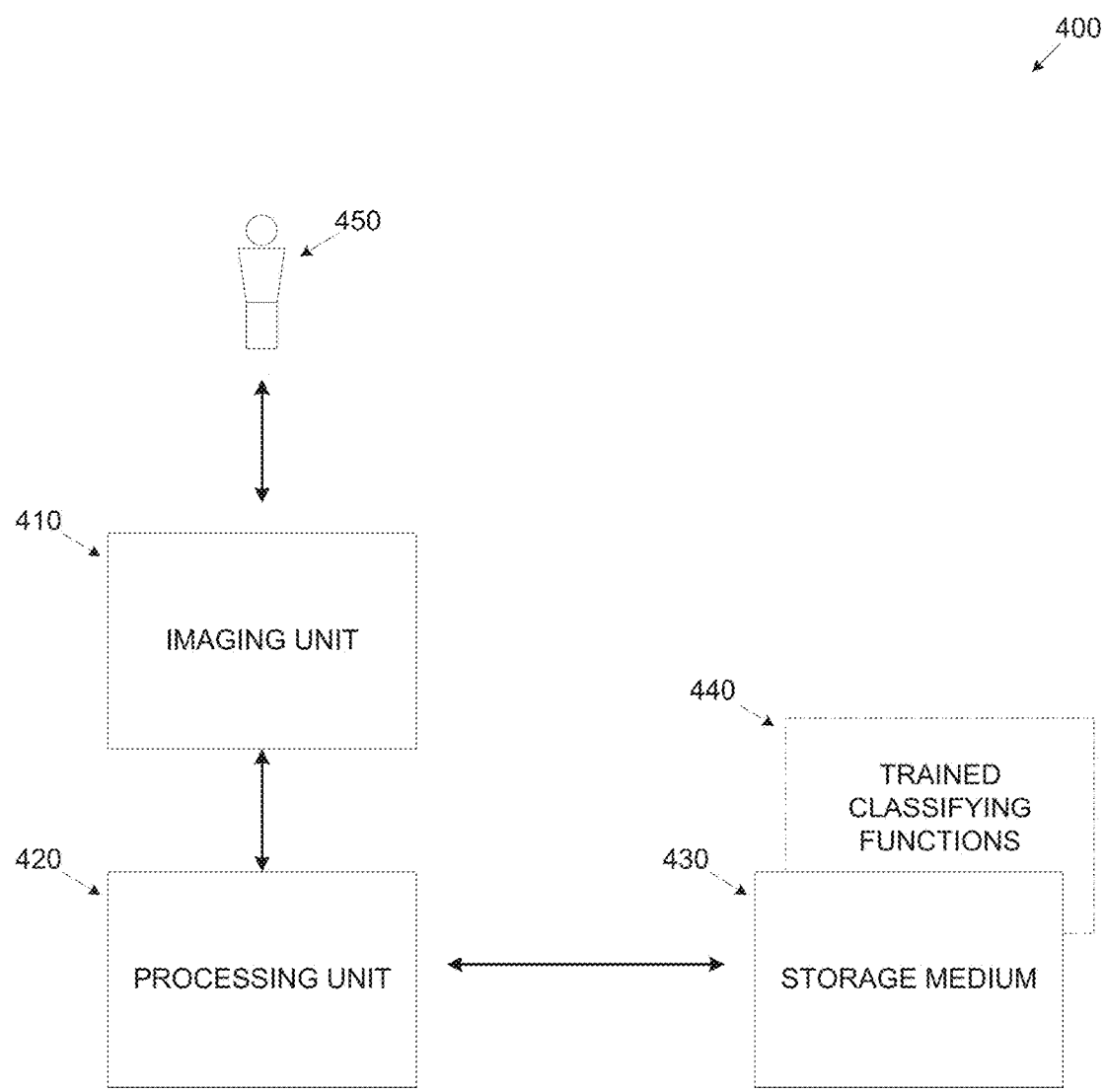
FIG. 4 is a schematic illustration of exemplary system for recognizing hand gestures using discrete pose values, according to some embodiments of the present disclosure.

Reference is now made to FIG. 4 which is a schematic illustration of exemplary system for recognizing hand poses using discrete pose values, according to some embodiments of the present disclosure. An exemplary system 400 includes an imaging unit 410 for capturing hand(s) movements of a user 450, one or more hardware processors 420 for classifying one or more hand poses of the user 450 as depicted by captured one or more images and a storage medium 430 for storing trained classifying functions (classifiers) 440 used by the processor 420 for classifying the one or more hand poses of the user 450. The imaging unit 410 may include one or more imaging devices, for example, a camera sensor, a stereo camera, a depth camera and/or an IR sensor. The imaging unit 410 which monitors the hand(s) movements of the user 450 may transmit one or more captured images to the processor 420. The processor 120 may employ a pose classification process, such as the classification process 100 to classify one or more hand poses as depicted by the one or more captured images.

Figure 5:
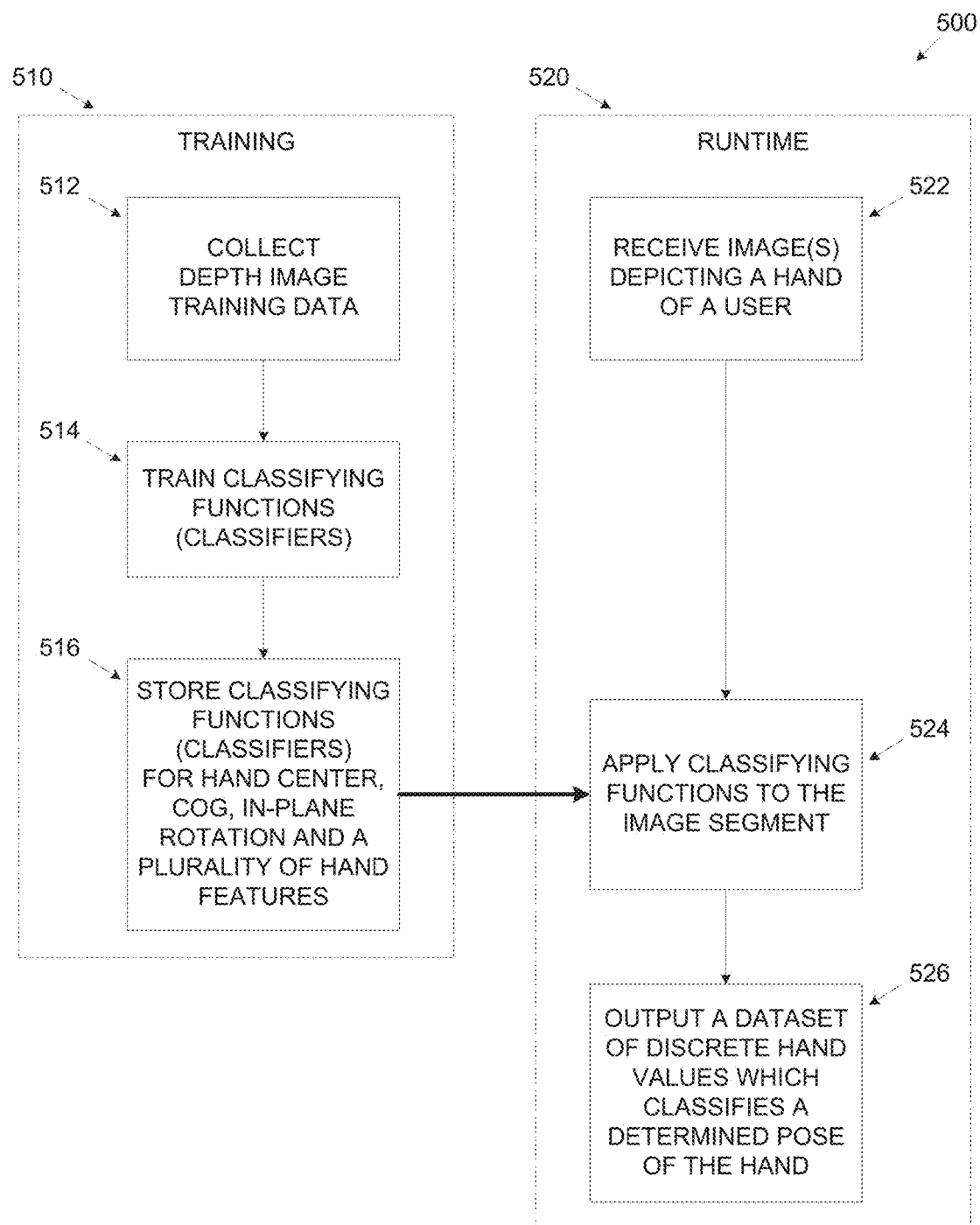
FIG. 5 is a schematic illustration of an exemplary process for training and applying classifying functions (classifiers) to an image(s) depicting a hand of a user in order to identify and classify a pose of the hand, according to some embodiments of the present disclosure.

Reference is now made to FIG. 5 which is a schematic illustration of an exemplary process for training and applying classifying functions (classifiers) to image(s) depicting a hand of a user in order to identify and classify a pose of the hand, according to some embodiments of the present disclosure. As shown at 500, classification of one or more hand poses is achieved through two separate processes—a training session 510 and a runtime process 520. During the training session 510 a plurality of classifying functions (classifiers) such as, for example, the center of hand classifying functions, the GOC classifying functions, the in-plane classifying functions and/or the hand pose features classifying functions are trained. The classifying functions may employ for example, DFE and/or "long tree" architecture.

The training session 510 is performed off-line and is does not require processing, and/or other resources during runtime. As shown at 512, training the plurality of the classifying functions starts with collecting a plurality of depth image, IR image and/or RGB image training data records which may be, for example, one or more image(s) and/or relevant image segment(s) of a plurality of hand pose(s) articulated by one or more training users. Each of the depth image training data records is assigned with a classification label associated with the hand pose depicted by the respective one of the training depth image data record. As shown at 514, the training depth image data records are driven through the classifying functions (classifiers) followed by optimization of the classifying functions using, for example, an SVM, DFE and/or "long tree". Training some of the classifying functions may depend on trained classification functions which completed the training session, for example, training the hand pose features classifying functions may require that the in-plane classifying functions are already trained. Optionally, each of the sets of classifying functions, for example, the GOC classifying functions, the in-plane classifying functions and/or the hand pose features classifying functions are each trained using one or more different portions of the training data records to avoid overfitting of the classifying functions.

Further detail on the DFE classifiers architecture and training is presented in section 3 of the publication "Discriminative Ferns Ensemble for Hand Pose Recognition" by Eyal Krupka et al., whose disclosure is incorporated herein by reference. Further detailed description of creating, training and/or using and/or a combination of DFEs and "long tree" architecture for hand pose and/or motion recognition is described in U.S. patent application Ser. No. 14/985,803 entitled "Structure and Training for Image Classification", whose disclosure is incorporated herein by reference. As shown at 516, the center of hand classifying functions, the GOC classifying functions, the in-plane classifying functions and/or the hand pose features classifying functions are stored at a storage, for example, storage medium and/or a memory of one or more computerized devices, for example, a computer and/or a server. During the runtime process 520, such as the classification process 100, one or more hand poses of a user are recognized and/or classified as one or more of pre-defined hand poses using the trained classifying functions.

As shown at 522, the runtime process 520 starts with receiving one or more runtime images depicting the hand of the user. As shown at 524, the plurality of classifiers available from the storage, for example, the center of hand classifying functions, the GOC classifying functions, the in-plane classifying functions and/or the hand pose features classifying functions are applied to the one or more runtime images in order to classify the hand pose depicted in the one or more runtime images as a determined one of a plurality of pre-defined hand poses which are registered and/or available from the storage. As shown at 526, a features dataset is created which includes one or more discrete pose values each representing a state of a corresponding hand feature as classified during classification stage 526. The features dataset may include a score describing a probability rate of the classification of the hand pose depicted by the image segment being the determined hand pose.

A classification process such as the classification process 100 in which the one or more hand poses are classified using the DFE and/or "long tree" architectures based on discrete representation of the hand skeleton may dramatically reduce the processing resources required for the classification process in runtime for two main reasons. First the classifying functions operate over binary values of the discrete pose values each corresponding to one of the hand pose features. Second the discrete values representation of the one or more hand poses allows for a finite number of values to define each of the one or more hand pose features thus avoiding the need for full (continuous) hand modeling. The discrete architecture for representing the one or more hand poses as created offline is therefore an essential element for classifying the one or more hand poses in runtime.

Figure 6:
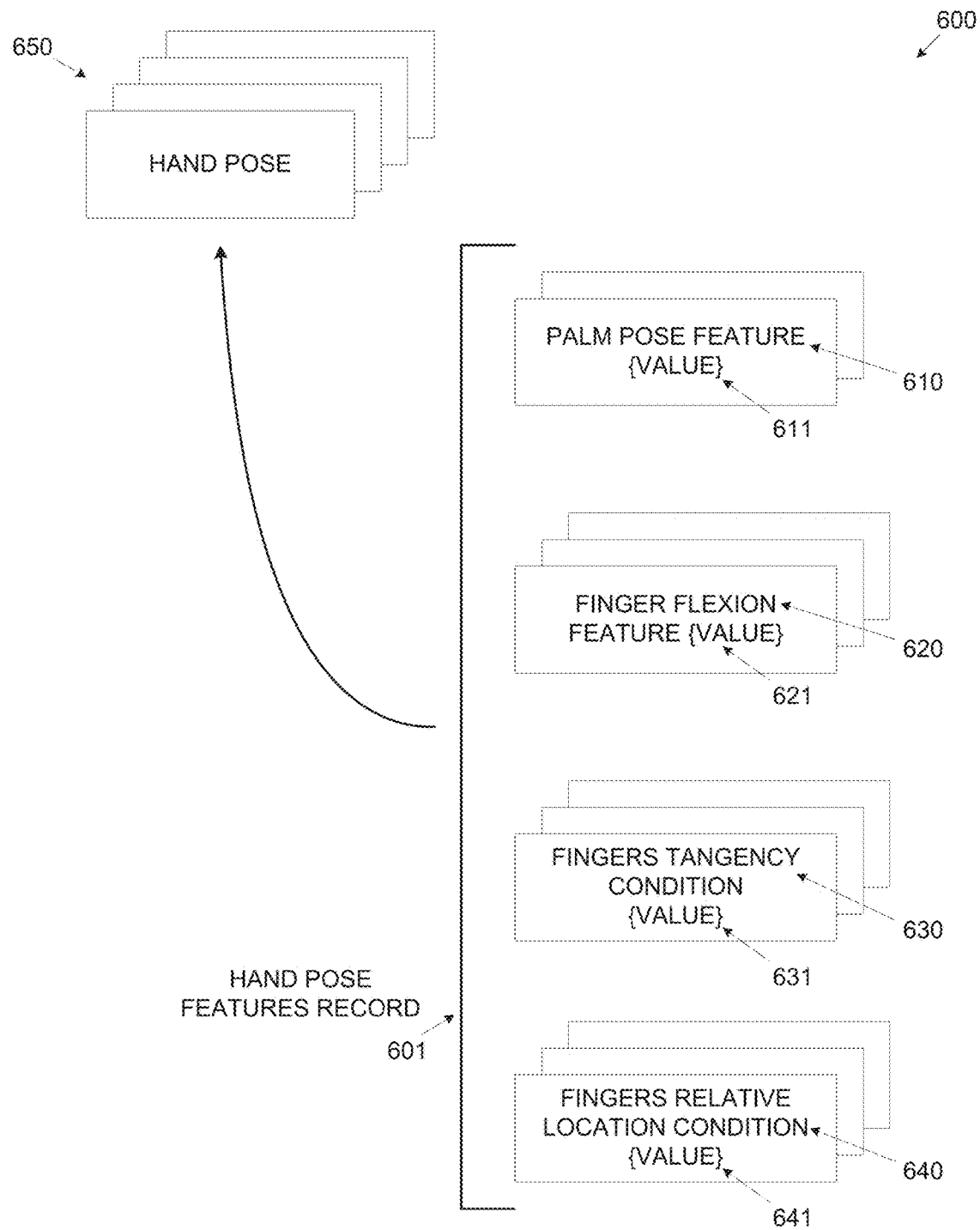
FIG. 6 is a schematic illustration of exemplary hand poses representation, according to some embodiments of the present disclosure.

Reference is now made to FIG. 6 which is a schematic illustration of exemplary hand poses representation, according to some embodiments of the present disclosure. Illustration 600 depicts exemplary hand poses 650 representations as hand pose features records 601 which include one or more hand pose features 610, 620, 630 and 640. Each of the hand pose features 610, 620, 630 and/or 640 may be assigned with one or more discrete pose value 611, 621, 631 and/or 641 which identify the state (value) of the respective hand pose feature 610, 620, 630 and/or 640 for an associated hand pose of the hand poses 650. Continuous values of the one or more hand pose features 610, 620, 630 and/or 640 may be represented by the discrete pose values 611, 621, 631 and/or 641 by quantizing the continuous values.

The combination of the one or more discrete pose values 611, 621, 631 and/or 641 of the respective hand pose features 610, 620, 630 and 640 as defined by the hand pose features record 601 identifies a specific pose of the hand poses 650. During runtime a classification process such as the classification process 100 may match the produced features dataset as created in step 180 to the hand pose features record 601 of one or more of the hand poses 650 in order to classify and/or recognize the hand pose of a user as depicted in received captured image as one of the hand poses 650. The hand pose features record 601 may be represented as, for example, a features vector, a features matrix and/or a features table. The hand pose features record 601 may include values of one or more of the following hand pose features:

- Palm pose features—one or more palm pose features 610 include, for example, hand selection, palm direction, palm rotation and/or hand location. Hand selection may identify which hand is active and may include discrete pose values 611 such as, for example, right, left, both and/or any. Palm direction may define the direction in which the palm of the active hand is facing and may include discrete pose values 611 such as, for example, left, right, up, down, forward and/or backward. Palm rotation may define the rotation state of the palm of the active hand and may include discrete pose values 611 such as, for example, left, right, up, down, forward and/or backward. Alternatively, the rotation may be defined by discrete pose values 611 identifying, for example, Euler angles and/or Tait-Bryan 3D rotation angles relative to a pre-defined hand orientation. For example, a hand which is facing frontal to the imaging device may be defined as a reference image with angles (0, 0, 0) while other hand orientation defined are define by discrete pose values 611 specifying the three rotation angles with respect to the reference image using, for example, a Tait-Bryan angles definition. Optionally the 3D rotation angles may not be precisely estimated precisely, however it the estimation is sufficient to represent the hand orientation angles with discrete categories. Hand location may identify the spatial location of the active hand in space and may include discrete pose values 611 such as, center of field of view (FOV), right side of FOV, left side of FOV, top of FOV, bottom of FOV, front of FOV and/or rear of FOV. Where FOV is for example, the visible space of an imaging device monitoring the movement of the user's hand. Optionally, hand location is identified with respect to a fixed object present in the FOV, for example, keyboard and/or pointing device so that hand location may be defined by discrete pose values 611 such as, for example, above_keyboard, behind_keyboard, right_of_keyboard and/or left_of_keyboard.
- Finger flexion features—one or more finger flexion features 620 which are defined per finger. For example, a finger flexion feature 620 may be a flexion and/or curve state which may include discrete pose values 621 such as, for example stretched, folded and/or open represented, for example by 0, 1, and 2. Each finger (thumb, index, middle, ring and/or pinky) is assigned one or more specific finger features, for example, {thumb, middle, ring, pinky} in {folded} state and {index} in {stretched} state.
- Finger tangency condition features—one or more fingers tangency features 630 which are defined per finger. The tangency feature may define a touch condition of any two or more fingers and/or touch type and may include discrete pose values 631 such as, for example, not touching, fingertip and/or full touch.
- Finger relative location condition features—one or more fingers relative location features 640 are defined per finger. Each of the finger relative location condition features 640 may define a relative location of one finger in relation to another. The fingers relative location features 640 may include discrete pose values 641 such as, for example, one or more fingers are located relatively to another one or more fingers to the left, right, above, below, inward, outward, in front and/or behind.

Each one of the hand poses 650 is defined by a unique one of the hand pose features records 601 which may be a combination and/or sequence of one or more discrete pose values 611, 621, 631 and/or 641 each providing a value of the corresponding hand pose feature 610, 620, 630 and/or 640. The hand pose features records 601 may include only some (and not all) of the discrete pose values 611, 621, 631 and/or 641 while other discrete pose values 611, 621, 631 and/or 641 which are not included are left free. For example, the hand pose features records 601 may define a specific state of the fingers (for example discrete pose values 621, 631 and/or 641) while the direction of the hand is left unspecified (for example discrete pose value 111). In such a case the hand pose 650 may be identified, recognized and/or classified in runtime at the detection of the fingers state as defined by the hand pose features records 601 with the hand facing any direction. The discrete representation of the hand pose features 610, 620, 630 and/or 640 may not be limited to discrete values only. Continuous values of the one or more hand features 610, 620, 630 and/or 640 may be represented by discrete pose values 611, 621, 631 and/or 641 respectively by quantizing the continuous values. For example, the palm rotation palm pose feature may be defined with 8 discrete motion values 611—0°, 45°, 90°, 135°, 180°, 225°, 270° and 315° to quantize the complete rotation range of 0°-360°. Recognition, identification and/or classification of the one or more hand poses 650 may also be simplified since the discrete pose values 611, 621, 631 and/or 641 may be easily classified because there is no need for hand skeleton modeling thus reducing the level of computer vision processing. The classifying functions, for example, the hand pose features classifying functions may be greatly simplified thus reducing the processing load during runtime due to the discrete representation of the hand poses 650 which allows for a finite, limited number of possible states for each of the hand pose features 610, 620, 630 and/or 640.

The hand poses 650 may be performed by the user in runtime while the user's hand is rotated and/or not aligned in the 3D space. To overcome this, a plurality of classifying functions such as the GOC classifying functions are trained to identify 3D spatial rotation and select an appropriate GOC according to which the appropriate set of in-plane rotation classifying functions and/or hand pose features classifying functions may be selected as described in the classification process 100. Furthermore, after the GOC is selected alignment of the image segment may be required to bring the hand as depicted in the received captured images in runtime to a position which may be matched to the one or more hand poses 650. The alignment is performed as described in step 160 of the classification process 100. After the image segment is aligned the plurality of hand pose features classifying functions may be applied to it to produce the features dataset representing the hand pose depicted in the image segment and the features dataset may be compared to hand pose features records 601 of one or more poses 650 to match and classify the depicted hand pose with a pre-defined hand pose 650.

Figure 7:
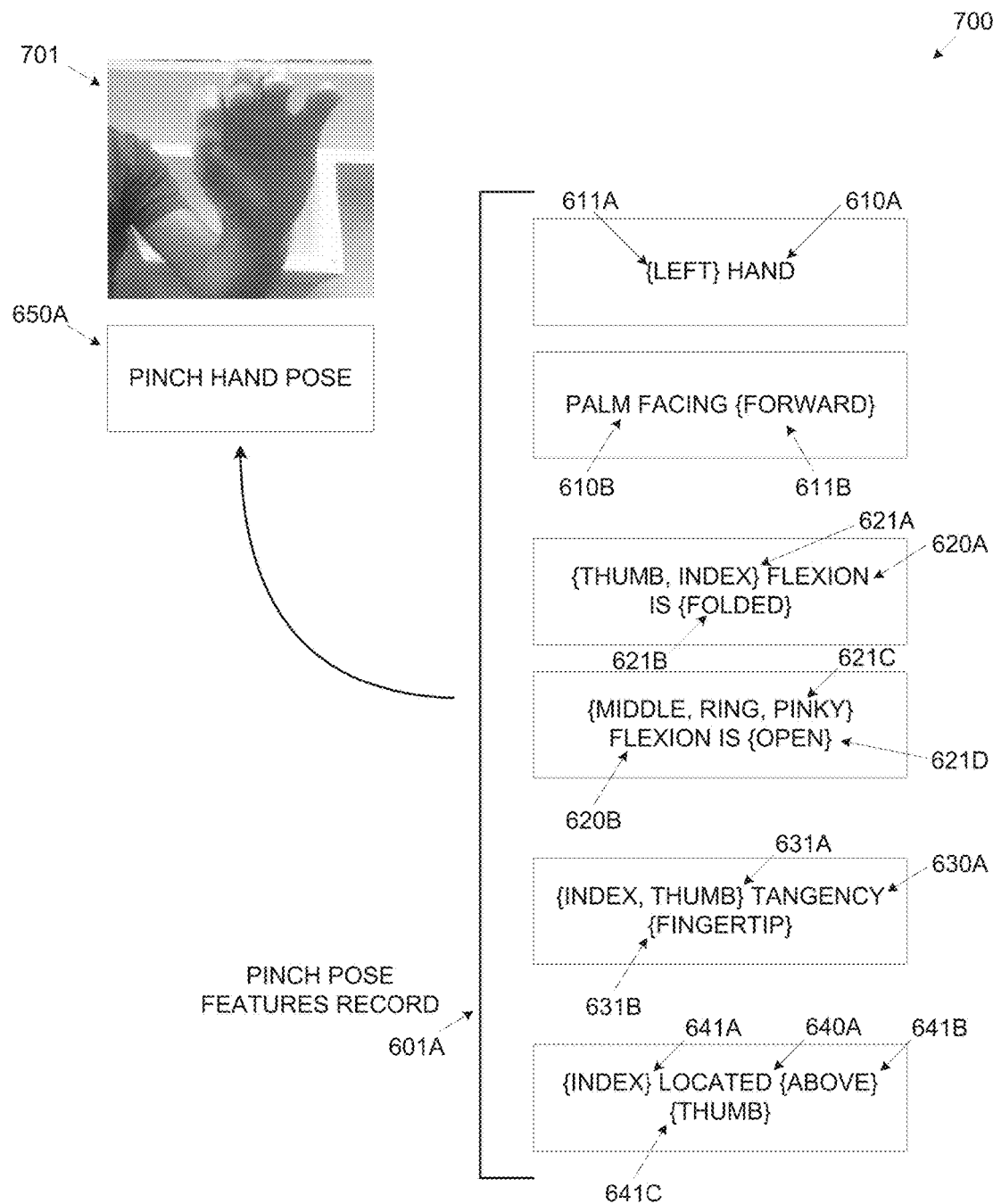
FIG. 7 is a schematic illustration of an exemplary pinch hand pose representation, according to some embodiments of the present disclosure.

Reference is now made to FIG. 7 which is a schematic illustration of an exemplary pinch hand pose representation, according to some embodiments of the present disclosure. Illustration 700 depicts an exemplary pinch hand pose 650A representation by a pinch pose features record 601A comprising discrete pose values such as the discrete pose values 611, 621, 631 and/or 641, each indicating a value of a corresponding hand pose feature such as the hand pose features 610, 620, 630 and/or 640. The pinch hand pose 650A which is visualized through an image capture 701 is created with some of the plurality of discrete pose values 611, 621, 631 and 641 as follows:

A hand selection feature 610A is assigned a discrete pose value 611A to indicate the left hand is active.

A palm direction feature 610B is assigned a discrete pose value 611B to indicate the active hand is facing forward.

A fingers flexion feature 620A is assigned a discrete pose value 621A and a discrete pose value 621B to indicate the thumb and index fingers are folded.

A fingers flexion feature 620B is assigned a discrete pose value 621C and a discrete pose value 121D to indicate the middle, ring and pinky fingers are open.

A fingers tangency condition feature 630A is assigned a discrete pose value 631A and a discrete pose value 631B to indicate the thumb and index fingers are touching at their tips.

A fingers relative location feature 640A is assigned a discrete pose value 641A, a discrete pose value 641B and a discrete pose value 641C to indicate the index finger is located above the thumb finger.

As seen above, the pinch hand pose 650A is uniquely defined by a pinch features pose features record 601A comprising the discrete pose values 611A, 611B, 621A, 621B, 621C, 621D, 631A, 631B, 641A, 641B and 641C corresponding to the hand pose features 610A, 610B, 620A, 620B, 630A and 640A respectively.

It is expected that during the life of a patent maturing from this application many relevant DFE, HMI and/or NUI will be developed and the scope of the term DFE, HMI and/or NUI is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "hand pose" or "at least hand pose" may include a hand pose performed by a single hand, both hands and/or any hand.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some embodiments of the present disclosure there is provided a compute implemented method of computing a features dataset classifying a pose of a hand of a human by applying in a hierarchal manner a plurality of classifying functions (classifiers) on images depicting said hand. The method comprises:

Selecting, using a computerized processor, a GOC defining a spatial orientation of a hand of a human in 3D space by applying a plurality of GOC classifying functions on a received image segment depicting the hand.

Identifying an in-plane rotation by applying a plurality of in-plane rotation classifying functions on the image segment. The plurality of in-plane rotation classifying functions is selected according to the GOC.

Aligning the image segment in 2D plane according to the identified in-plane rotation;

Applying a plurality of hand feature classifying functions on the aligned image segment. Each one of the plurality of feature classifying functions outputs a current discrete pose value of an associated one of a plurality of hand pose features.

Outputting a features dataset defining a respective current discrete pose value for each of the plurality of hand pose features for classifying a current hand pose of the hand.

Optionally, the GOC is identified after estimating a center of hand by applying a plurality of center of hand classifying functions on the image segment.

Optionally, the center of hand is derived from a center of mass of the hand. The center of mass is identified by analyzing a depth image data available from an image depicting the hand. The depth image data maps depth of the hand in 3D.

The plurality of center of hand classifying functions are trained statistical classifiers used for regression analysis.

Optionally, the image is manipulated to remove at least one non-relevant image portion to produce an image segment.

The plurality of GOC classifying functions are trained statistical classifiers.

The plurality of in-plane rotation classifying functions are trained statistical classifiers.

The said plurality of hand feature classifying functions are trained statistical classifiers.

Optionally, the features dataset includes a score assigned to the current hand pose. The score indicates a probability rate of the current hand pose matching one of a plurality of pre-defined hand poses features datasets.

Optionally, the image segment is scaled to comply with scale of a training dataset used for training one or more of, the plurality of GOC classifying functions, the plurality of in-plane rotation classifying functions and/or the plurality of hand feature classifying functions.

According to some embodiments of the present disclosure there is provided systems for computing a features dataset classifying a pose of a hand of a human by applying in a hierarchal manner a plurality of classifying functions (classifiers) on images depicting the hand. The system includes a storage storing a plurality of pre-defined hand poses features datasets, a memory storing a code and one or more processors coupled to the storage and the memory for executing the stored code. The code comprises:

Code instructions to select a global orientation category (GOC) defining a spatial orientation of a hand of a human in a 3D space by applying a plurality of GOC classifying functions on a received image segment depicting the hand.

Code instructions to identify an in-plane rotation by applying a plurality of in-plane rotation classifying functions on the image segment. The plurality of in-plane rotation classifying functions is selected according to the GOC.

Code instructions to align the image segment in a 2D plane according to the identified in-plane rotation.

Code instructions to apply a plurality of hand feature classifying functions on the aligned image segment. Each one of said plurality of feature classifying functions outputs a current discrete pose value of an associated one of a plurality of hand pose features.

Code instructions to output a features dataset defining a respective current discrete pose value for each of the plurality of hand pose features for classifying a current hand pose of the hand.

Optionally, the GOC is identified after estimating a center of hand by applying a plurality of center of hand classifying functions on the image segment.

Optionally, the center of hand is derived from a center of mass of the hand. The center of mass is identified by analyzing a depth image data available from an image depicting the hand. The depth image data maps a depth of the hand in the 3D space.

Optionally, the image is manipulated to remove at least one non-relevant image portion to produce an image segment.

Optionally, the features dataset includes a score assigned to the current hand pose. The score indicates a probability rate of the features dataset matching one of the plurality of the pre-defined hand poses features datasets.

According to some embodiments of the present disclosure there is provided a software program product for computing a feature dataset classifying a pose of a hand of a human by applying in a hierarchal manner a plurality of classifying functions (classifiers) on images depicting said hand. The software program product is stored in a non-transitory computer readable storage medium and comprises:

First program instructions to access a memory storing a plurality of hand pose features datasets.

Second program instructions to select, using a computerized processor, a global orientation category (GOC) defining a spatial orientation of a hand of a human in a 3D space by applying a plurality of GOC classifying functions on a received image segment depicting the hand.

Third program instructions to identify an in-plane rotation by applying a plurality of in-plane rotation classifying functions on the image segment. The plurality of in-plane rotation classifying functions is selected according to the GOC.

Fourth program instructions to align the image segment in a 2D plane according to the identified in-plane rotation.

Fifth program instructions to apply a plurality of hand feature classifying functions on the aligned image segment. Each one of the plurality of feature classifying functions outputs a current discrete pose value of an associated one of a plurality of hand pose features.

Sixth program instructions to output a features dataset defining respective current discrete pose value for each of the plurality of hand pose features for classifying a current hand pose of the hand.

The first, second, third, fourth, fifth and sixth program instructions are executed by one or more computerized processor from the non-transitory computer readable storage medium.

Optionally, the GOC is identified after estimating a center of hand by applying a plurality of center of hand classifying functions on the image segment.

Optionally, the center of hand is derived from a center of mass of the hand. The center of mass is identified by analyzing a depth image data available from an image depicting the hand. The depth image data maps a depth of the hand in the 3D space.

The plurality of center of hand classifying functions are trained statistical classifiers used for regression analysis.

Optionally, the image is manipulated to remove at least one non-relevant image portion to produce an image segment.

The plurality of GOC classifying functions are trained statistical classifiers.

The plurality of in-plane rotation classifying functions are trained statistical classifiers.

The plurality of hand feature classifying functions are trained statistical classifiers.

Optionally, the features dataset includes a score assigned to the current hand pose. The score indicates a probability rate of the features dataset matching one of a plurality of pre-defined features datasets.

Optionally the software program product comprises seventh program instructions to scale the image segment to comply with a scale of a training dataset used for training one or more of, the plurality of GOC classifying functions, the plurality of in-plane rotation classifying functions and/or the plurality of hand feature classifying functions. The seventh program instructions are executed by the one or more computerized processors from the non-transitory computer readable storage medium.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A computer implemented method of computing a features dataset classifying a pose of a hand of a human, comprising:

selecting, using a computerized processor, a global orientation category (GOC) defining a spatial orientation of a hand of a human in a three dimensional (3D) space by applying a plurality of GOC classifying functions on a received image segment depicting said hand;

identifying an in-plane rotation by applying a plurality of in-plane rotation classifying functions on said image segment, said plurality of in-plane rotation classifying functions being selected according to said GOC;

aligning said image segment in a 2 dimensional (2D) plane according to said identified in-plane rotation;

applying a plurality of hand feature classifying functions on said aligned image segment, each one of said plurality of feature classifying functions outputting a current discrete pose value of an associated one of a plurality of hand pose features; and outputting a features dataset defining a respective said current discrete pose value for each of said plurality of hand pose features for classifying a current hand pose of said hand;

wherein said GOC is identified after estimating a center of hand by applying a plurality of center of hand classifying functions on said image segment.

2. The computer implemented method of claim 1, further comprising said center of hand is derived from a center of mass of said hand, said center of mass is identified by analyzing a depth image data available from an image depicting said hand, said depth image data maps a depth of said hand in said 3D space.

3. The computer implemented method of claim 2, further comprising, said image is manipulated to remove at least one non-relevant image portions to produce an image segment.

4. The computer implemented method of claim 1, wherein said plurality of center of hand classifying functions are trained statistical classifiers used for regression analysis.

5. The computer implemented method of claim 1, wherein said plurality of GOC classifying functions are trained statistical classifiers.

6. A computer implemented method of computing a features dataset classifying a pose of a hand of a human, comprising:
selecting, using a computerized processor, a global orientation category (GOC) defining a spatial orientation of a hand of a human in a three dimensional (3D) space by applying a plurality of GOC classifying functions on a received image segment depicting said hand;
identifying an in-plane rotation by applying a plurality of in-plane rotation classifying functions on said image segment, said plurality of in-plane rotation classifying functions being selected according to said GOC;
aligning said image segment in a 2 dimensional (2D) plane according to said identified in-plane rotation;
applying a plurality of hand feature classifying functions on said aligned image segment, each one of said plurality of feature classifying functions outputting a current discrete pose value of an associated one of a plurality of hand pose features; and
outputting a features dataset defining a respective said current discrete pose value for each of said plurality of hand pose features for classifying a current hand pose of said hand;
wherein said plurality of in-plane rotation classifying functions are trained statistical classifiers.

7. The computer implemented method of claim 6, wherein said plurality of hand feature classifying functions are trained statistical classifiers.

8. The computer implemented method of claim 6, further comprising said features dataset includes a score assigned to said current hand pose, said score indicates a probability rate of said current hand pose matching one of a plurality of pre-defined hand poses features datasets.

9. The computer implemented method of claim 6, further comprising scaling said image segment to comply with a scale of a training dataset used for training at least one of: said plurality of GOC classifying functions, said plurality of in-plane rotation classifying functions and said plurality of hand feature classifying functions.

10. A system for computing a features dataset classifying a pose of a hand of a human, comprising:
a storage storing a plurality of pre-defined hand poses features datasets;
a memory storing a code;
at least one processor coupled to said storage and said memory for executing said stored code, said code comprising:
code instructions to select a global orientation category (GOC) defining a spatial orientation of a hand of a human in a three dimensional (3D) space by applying a plurality of GOC classifying functions on a received image segment depicting said hand;
code instructions to identify an in-plane rotation by applying a plurality of in-plane rotation classifying functions on said image segment, said plurality of in-plane rotation classifying functions being selected according to said GOC;
code instructions to align said image segment in a 2 dimensional (2D) plane according to said identified in-plane rotation;
code instructions to apply a plurality of hand feature classifying functions on said aligned image segment, each one of said plurality of feature classifying functions outputting a current discrete pose value of an associated one of a plurality of hand pose features; and
code instructions to output a features dataset defining a respective said current discrete pose value for each of said plurality of hand pose features for classifying a current hand pose of said hand;
wherein said GOC is identified after estimating a center of hand by applying a plurality of center of hand classifying functions on said image segment.

11. The system of claim 10, further comprising said center of hand is derived from a center of mass of said hand, said center of mass is identified by analyzing a depth image data available from an image depicting said hand, said depth image data maps a depth of said hand in said 3D space.

12. The system of claim 11, further comprising said image is manipulated to remove at least one non-relevant image portion to produce an image segment.

13. The system of claim 10, further comprising said features dataset includes a score assigned to said current hand pose, said score indicates a probability rate of said features dataset matching one of said plurality of pre-defined hand poses features datasets.

14. A software program product for computing a feature dataset classifying a pose of a hand of a human, comprising:
a non-transitory computer readable storage medium;
first program instructions to access a memory storing a plurality of hand pose features datasets;
second program instructions to select, using a computerized processor, a global orientation category (GOC) defining a spatial orientation of a hand of a human in a three dimensional (3D) space by applying a plurality of GOC classifying functions on a received image segment depicting said hand;
third program instructions to identify an in-plane rotation by applying a plurality of in-plane rotation classifying functions on said image segment, said plurality of in-plane rotation classifying functions being selected according to said GOC;
fourth program instructions to align said image segment in a 2 dimensional (2D) plane according to said identified in-plane rotation;
fifth program instructions to apply a plurality of hand feature classifying functions on said aligned image segment, each one of said plurality of feature classifying functions outputting a current discrete pose value of an associated one of a plurality of hand pose features; and
sixth program instructions to output a features dataset defining a respective said current discrete pose value for each of said plurality of hand pose features for classifying a current hand pose of said hand;
wherein said first, second, third, fourth, fifth and sixth program instructions are executed by at least one computerized processor from said non-transitory computer readable storage medium;
wherein said GOC is identified after estimating a center of hand by applying a plurality of center of hand classifying functions on said image segment.

15. The software program product of claim 14, further comprising said center of hand is derived from a center of mass of said hand, said center of mass is identified by analyzing a depth image data available from an image depicting said hand, said depth image data maps a depth of said hand in said 3D space.

16. The software program product of claim 15, further comprising said image is manipulated to remove at least one non-relevant image portions to produce an image segment.

17. The software program product of claim 14, wherein said plurality of center of hand classifying functions are trained statistical classifiers used for regression analysis.

18. The software program product of claim 14, wherein said plurality of GOC classifying functions are trained statistical classifiers.

19. A software program product for computing a feature dataset classifying a pose of a hand of a human, comprising:
a non-transitory computer readable storage medium;
first program instructions to access a memory storing a plurality of hand pose features datasets;
second program instructions to select, using a computerized processor, a global orientation category (GOC) defining a spatial orientation of a hand of a human in a three dimensional (3D) space by applying a plurality of GOC classifying functions on a received image segment depicting said hand;
third program instructions to identify an in-plane rotation by applying a plurality of in-plane rotation classifying functions on said image segment, said plurality of in-plane rotation classifying functions being selected according to said GOC;
fourth program instructions to align said image segment in a 2 dimensional (2D) plane according to said identified in-plane rotation;
fifth program instructions to apply a plurality of hand feature classifying functions on said aligned image segment, each one of said plurality of feature classifying functions outputting a current discrete pose value of an associated one of a plurality of hand pose features; and
sixth program instructions to output a features dataset defining a respective said current discrete pose value for each of said plurality of hand pose features for classifying a current hand pose of said hand;
wherein said first, second, third, fourth, fifth and sixth program instructions are executed by at least one computerized processor from said non-transitory computer readable storage medium;
wherein said plurality of in-plane rotation classifying functions are trained statistical classifiers.

20. A software program product for computing a feature dataset classifying a pose of a hand of a human, comprising:
a non-transitory computer readable storage medium;
first program instructions to access a memory storing a plurality of hand pose features datasets;
second program instructions to select, using a computerized processor, a global orientation category (GOC) defining a spatial orientation of a hand of a human in a three dimensional (3D) space by applying a plurality of GOC classifying functions on a received image segment depicting said hand;
third program instructions to identify an in-plane rotation by applying a plurality of in-plane rotation classifying functions on said image segment, said plurality of in-plane rotation classifying functions being selected according to said GOC;
fourth program instructions to align said image segment in a 2 dimensional (2D) plane according to said identified in-plane rotation;
fifth program instructions to apply a plurality of hand feature classifying functions on said aligned image segment, each one of said plurality of feature classifying functions outputting a current discrete pose value of an associated one of a plurality of hand pose features; and
sixth program instructions to output a features dataset defining a respective said current discrete pose value for each of said plurality of hand pose features for classifying a current hand pose of said hand;
wherein said first, second, third, fourth, fifth and sixth program instructions are executed by at least one computerized processor from said non-transitory computer readable storage medium;
wherein said plurality of hand feature classifying functions are trained statistical classifiers.

21. The software program product of claim 20, further comprising said features dataset includes a score assigned to said current hand pose, said score indicates a probability rate of said features dataset matching one of a plurality of pre-defined hand poses features datasets.

22. The software program product of claim 20, further comprising seventh program instructions to scale said image segment to comply with a scale of a training dataset used for training at least one of: said plurality of GOC classifying functions, said plurality of in-plane rotation classifying functions and said plurality of hand feature classifying functions;
wherein said seventh program instructions are executed by said at least one computerized processor from said non-transitory computer readable storage medium.

* * * * *